US006972119B2

(12) United States Patent
Taguchi et al.

(10) Patent No.: US 6,972,119 B2
(45) Date of Patent: Dec. 6, 2005

(54) APPARATUS FOR FORMING HYDROGEN

(75) Inventors: Kiyoshi Taguchi, Osaka (JP); Takeshi Tomizawa, Ikoma (JP); Kunihiro Ukai, Ikoma (JP); Toshiyuki Shono, Kyoto (JP); Koichiro Kitagawa, Fujisawa (JP); Tetsuya Ueda, Kasugai (JP); Seiji Fujihara, Osaka (JP); Yutaka Yoshida, Nabari (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 399 days.

(21) Appl. No.: 10/168,854

(22) PCT Filed: Dec. 27, 2000

(86) PCT No.: PCT/JP00/09362

§ 371 (c)(1),
(2), (4) Date: Jun. 26, 2002

(87) PCT Pub. No.: WO01/47802

PCT Pub. Date: Jul. 5, 2001

(65) Prior Publication Data

US 2003/0003033 A1 Jan. 2, 2003

(30) Foreign Application Priority Data

Dec. 28, 1999 (JP) ................................ 11-373858
May 29, 2000 (JP) ............................ 2000-157756
Jun. 9, 2000 (JP) ............................ 2000-173135

(51) Int. Cl.[7] ................................................ B01J 3/00
(52) U.S. Cl. ...................... 422/188; 422/109; 422/114; 422/201; 422/217; 422/218; 48/63; 48/76; 48/127; 48/197 R; 423/652; 423/653; 423/654; 423/655; 423/656; 429/116; 429/117; 429/118; 429/119

(58) Field of Search ........................ 422/109–114, 201, 422/217–218, 188; 48/63, 76, 127, 197 R; 423/652–656; 429/116–119

(56) References Cited

U.S. PATENT DOCUMENTS 5,030,440 A 7/1991 Lywood et al. ............. 423/655

FOREIGN PATENT DOCUMENTS

EP 0 764 466 A2 3/1997
EP 0 861 802 A2 9/1998

(Continued)

OTHER PUBLICATIONS

T. Bunluesin et al., "Studies of the water-gas shift reaction on ceria supported Pt, Pd and Rh; implications for oxygen storage properties," Applied Catalysis B: Environmental 15 (1998) 107-114.*

(Continued)

*Primary Examiner*—Alexa Doroshenk-Neckel
*Assistant Examiner*—Vinit H. Patel
(74) *Attorney, Agent, or Firm*—McDermott Will & Emery LLP

(57) ABSTRACT

A hydrogen producing apparatus comprising: a reforming section having a reforming catalyst which causes a reaction between a carbon-containing organic compound as a feedstock and water; a feedstock supply section for supplying the feedstock to the reforming section; a water supply section for supplying water to the reforming section; a heating section for heating the reforming catalyst; a shifting section having a shift catalyst which causes a shift reaction between carbon monoxide and water contained in a reformed gas supplied from the reforming section; and a purifying section having a purifying catalyst which causes oxidation or methanation of carbon monoxide contained in a gas supplied from the shifting section, wherein the shift catalyst comprises a platinum group metal and a metal oxide.

4 Claims, 6 Drawing Sheets

FOREIGN PATENT DOCUMENTS

| | | |
|---|---|---|
| EP | 0 992 666 A1 | 6/1999 |
| JP | 50-84490 | 7/1975 |
| JP | 51-37078 | 10/1976 |
| JP | 58-32001 | 2/1983 |
| JP | 58-204801 | 11/1983 |
| JP | 62-250095 | 10/1987 |
| JP | 5-147903 | 6/1993 |
| JP | 5-258764 | 10/1993 |
| JP | 6-290801 | 10/1994 |
| JP | 7-57756 | 3/1995 |
| JP | 11-43303 | 2/1999 |
| JP | 11-300205 | 11/1999 |
| JP | 11-347414 | 12/1999 |
| JP | 2000-119004 | 4/2000 |
| JP | 2000-178007 | 6/2000 |
| JP | 2000-302410 | 10/2000 |
| JP | 2001-172003 | 6/2001 |
| WO | WO00/48261 | 8/2000 |
| WO | WO00/54879 | 9/2000 |

OTHER PUBLICATIONS

"Methanation and Water-Gas Shift Reactions over PT/$CcO_2$", Mendelovici et al., *Journal of Catalysis* 96, pp. 285-287, (1985).

"Water-gas shift conversion using a feed with a low steam to carbon monoxide ration and containing sulphur" , E. Xue et al. *Catalysis Today* 30, pp. 107-118 (1996).

* cited by examiner

F I G. 1
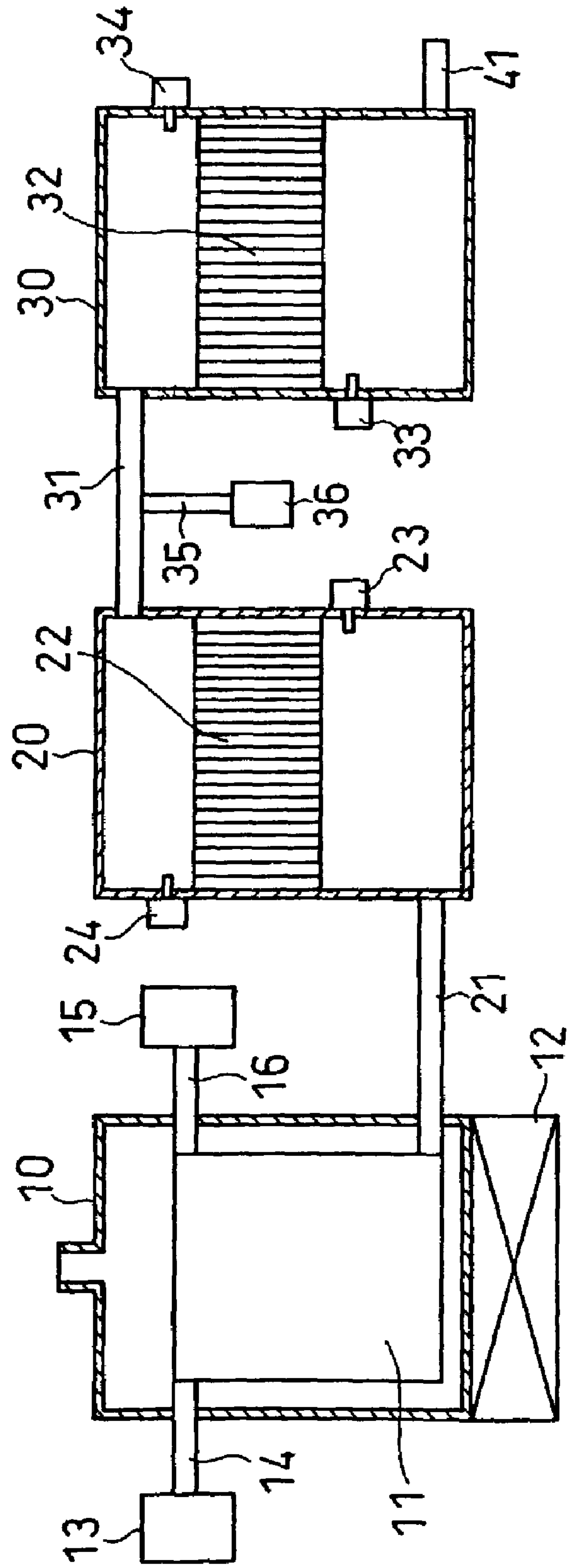

F I G. 5
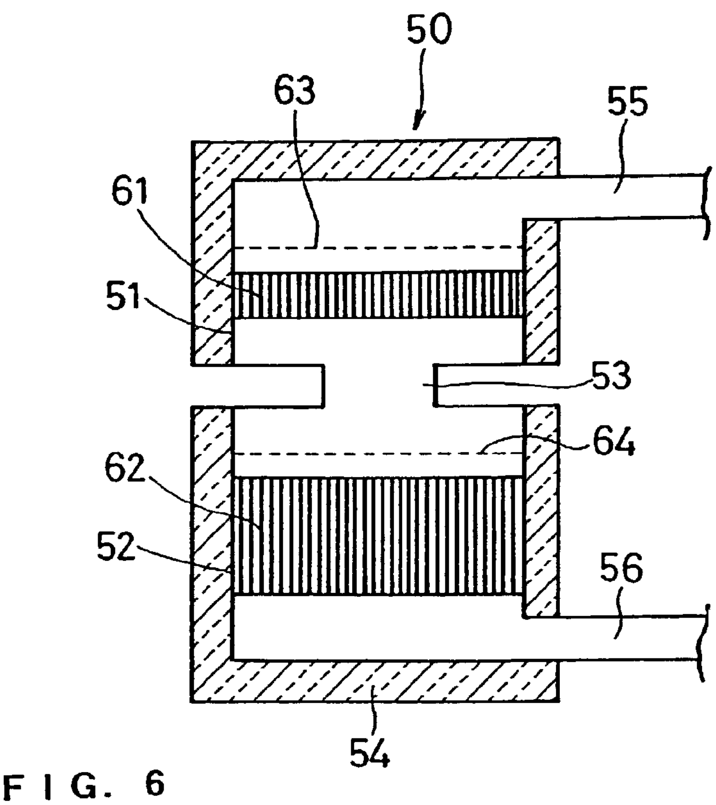
F I G. 6
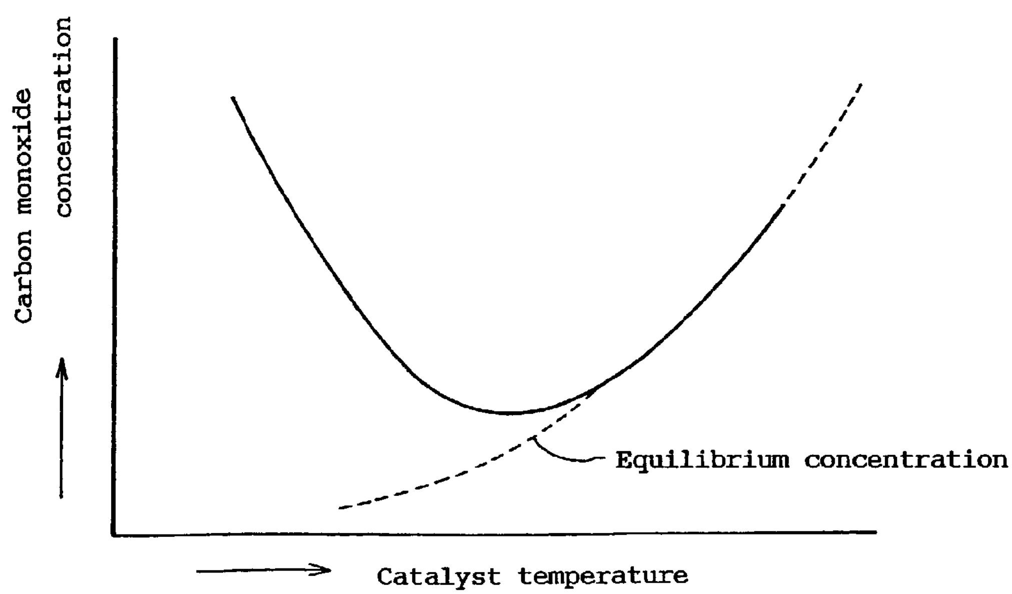

F I G. 7
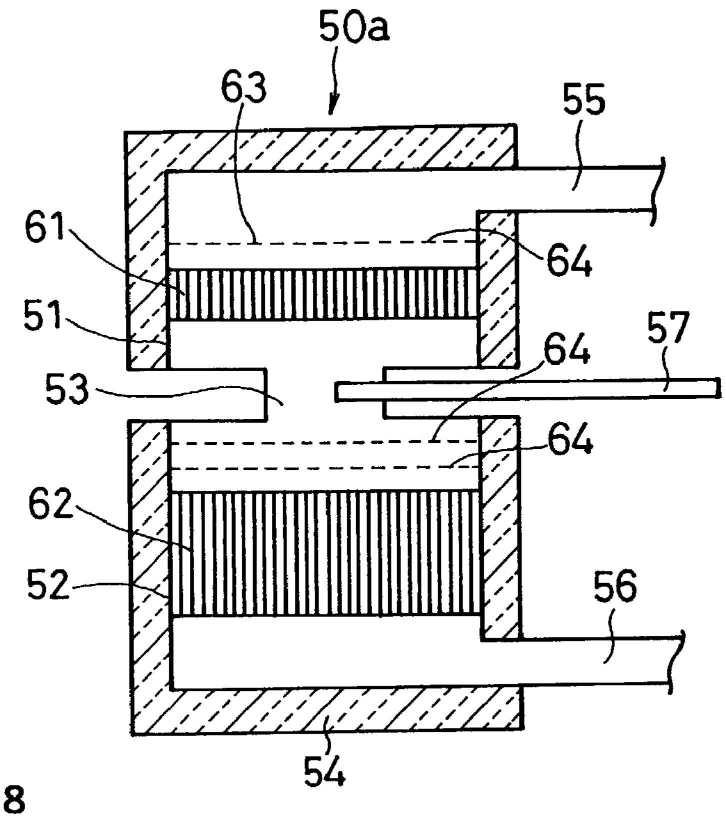
F I G. 8
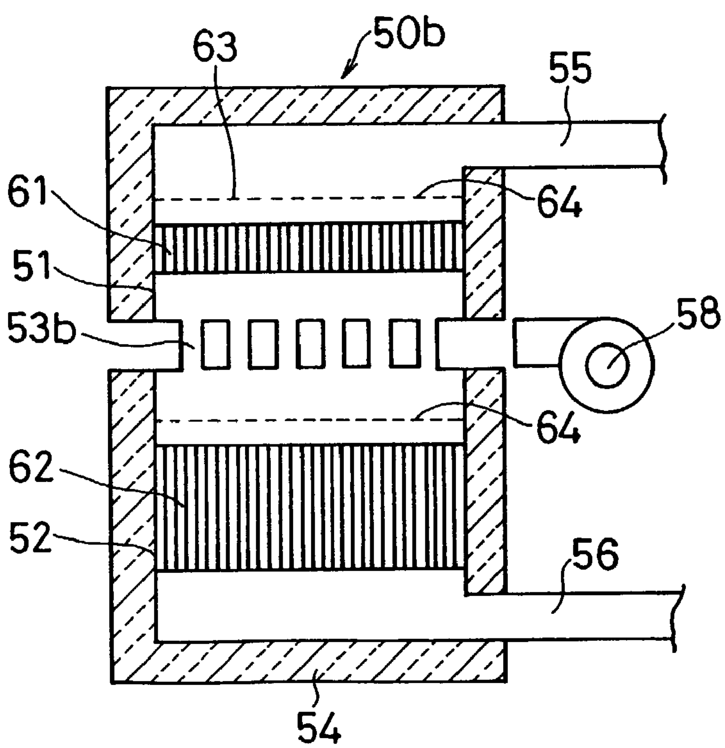

APPARATUS FOR FORMING HYDROGEN

TECHNICAL FIELD

The present invention relates to a hydrogen producing apparatus for supplying hydrogen to fuel cells or the like.

BACKGROUND ART

Cogeneration systems using a fuel cell having high power-generation efficiency are receiving special attention as decentralized power generation systems capable of effective utilization of energy. Many of the fuel cells, for example, phosphoric acid fuel cells currently commercially available and polymer electrolyte fuel cells currently under development, use hydrogen as a feedstock to generate electric power. Fuel infrastructure for hydrogen, however, has not yet been built up and the hydrogen therefore needs to be produced on a site where the cell is installed. Methods for producing the hydrogen includes a steam reforming method and an auto-thermal method. In the methods, a carbon-containing organic compound as the feedstock, for example, natural gas, hydrocarbon such as LPG, alcohol such as methanol, naphtha or the like is reacted with water in a reforming section having a reforming catalyst, to produce the hydrogen.

In the steam reforming reaction, carbon monoxide (CO) is generated as a by-product. Since the CO becomes a poisoning component of the electrode catalyst of the fuel cell especially in polymer electrolyte fuel cells that operate at low temperatures, there are also provided a shifting section in which a shift reaction converts water and the CO to hydrogen and carbon dioxide and a purifying section in which the CO is subjected to an oxidation or methanation reaction. In the shifting section, it is common to use a Fe—Cr based catalyst at temperatures from 300 to 500° C. or a Cu—Zn based catalyst at temperatures from 200 to 300° C. Since the Fe—Cr based catalyst is used at high temperatures, large reduction of CO is not possible. Since the Cu—Zn based catalyst is used at relatively low temperatures, the CO can be decreased to a considerably low concentration. Thus, the Cu—Zn based catalyst is used in the shifting section to eventually decrease the CO down to a concentration of about 0.5%. Also, in the purifying section, platinum group metal Pt or Ru based catalyst is used to selectively oxidize or methanize the CO, so that the CO is ultimately decreased down to a level of about 20 ppm.

The Cu—Zn based catalyst is active for the shift reaction while it is in a reduced state. When the apparatus is operated continuously, the Cu—Zn based catalyst is constantly in a reduced state, and therefore the activity of this catalyst hardly deteriorates. However, in the case of intermittent operations in which the apparatus is started and stopped repeatedly or in other cases, air gets into the shifting section to oxidize the catalyst, so that the activity of the catalyst deteriorates significantly. Further, the problem of catalyst activity deterioration arises also when the catalyst is used at high temperatures not lower than 300° C. and in other cases.

In order to improve acid resistance and thermal resistance, there is a proposal to use a catalyst of platinum group metal supported on a metal oxide as the shift catalyst. This catalyst of platinum group metal supported on a metal oxide hardly aggregates due to sintering of the catalyst even when used at a temperature of about 500° C. It also has an excellent feature that the catalyst activity does not change even in an oxidized state. However, in comparison with the Cu—Zn based catalyst, the reactivity at low temperatures may deteriorate slightly. This deterioration increases the CO concentration at the outlet of the shifting section and produces a problem that the conventional Pt or Ru based catalyst of the purifying section is unable to decrease the CO sufficiently.

Also, the above-described catalysts have a different reaction temperature and the catalysts therefore need to be heated up to the reaction temperature in order to facilitate stable supply of the hydrogen. The temperature is controlled to about 700° C. in the reforming section and about 500 to 200° C. in the shifting section. Since the temperature of the reforming section, which is located upstream of the feedstock flow, is high, heat from the reforming section, for example, heat contained in the reformed gas or excessive heat of a heating section of the reforming section, is often utilized to heat the shifting section in the hydrogen producing apparatus according to the steam reforming method.

In the conventional heating method in which the heat of the reformed gas released from the reforming section is utilized to heat the shifting section, it takes a long time for the catalyst temperature to become stable in correspondence with the thermal capacity of each reaction section. A hindrance to this temperature stabilization is condensation of water in the gas which takes place at low temperature parts of the gas flow route during the heating operation.

On the other hand, when a hydrocarbon based fuel is steam reformed, water is supplied in an amount greater than the necessary amount of water for reforming the hydrocarbon in order to prevent deposition of carbon. For example, when the feedstock is a hydrocarbon such as methane or LPG, it is a common practice to supply water which is equal to or more than 2.5 times the number of carbon atoms to facilitate steam reforming. This causes the gas released from the reforming section to contain a considerable amount of steam.

However, since the temperature does not rise to the boiling point or higher where condensation of water takes place, the water needs to be re-evaporated promptly in order to raise the temperature of each reaction section.

Also, when the apparatus is started from room temperature, in the shifting section and other parts that are heated by the heat contained in the reformed gas, condensation of excessive steam in the reformed gas takes place.

This condensation of water gives rise to following problems.

The first problem is that the temperature will not rise at a part where condensation has took place until condensed water evaporates again. For stable production of the hydrogen, the temperature of each section needs to be raised to a predetermined temperature promptly. However, heat is exchanged promptly between the gaseous steam and, for example, the walls of the apparatus, to cause condensation of water, but heat exchange between the liquid and, for example, the walls of the apparatus becomes a rate-determining step in evaporating the condensed water, thereby making the evaporation speed slow. The shifting section, in particular, has the shift catalyst having a large thermal capacity and a large amount of water therefore condenses. As a result, it takes a longer time to heat the shift catalyst up to an optimal reaction temperature, making the start-up time longer. Thus, reduction of the start-up time becomes a large problem with respect to apparatus operation in the apparatus to be subjected to frequent starts and stops.

The second is that the condensed water causes the catalytic activity of the shift catalyst to deteriorate. The Cu—Zn based catalyst having high catalytic activity is widely used as the shift catalyst. This catalyst is highly active while being in a reduced state. Since the catalyst is used at temperatures from 200 to 300° C., condensation of water does not occur and the catalyst can be maintained in a reduced state during the normal operation. When condensation of water takes place, however, the catalyst is oxidized by the water, so that the catalytic activity deteriorates remarkably. Thus, frequent starts and stops will cause the catalytic activity to deteriorate significantly, resulting in an increase in the CO concentration of the shifted gas. Particularly in an application as a hydrogen producing apparatus for supplying hydrogen to a solid polymer electrolyte fuel cell, the increase of CO impairs the power generating characteristics significantly, presenting a serious problem.

Many of the phosphoric acid fuel cells, which have already become commercially available, are operated continuously with fewer start-up operations, and the respective reaction sections are not heated frequently. On the other hand, fuel cells having a small power generating capacity, intended for home use or the like, are assumed to be subjected to frequent starts and stops of the apparatus. Thus, in order to reduce the start-up time of such apparatus with frequent starts and stops, it becomes a requisite to reduce condensation of water as much as possible.

Also, when condensation of water takes place over the shift catalyst, the catalyst is oxidized and the shift reaction of water and CO is thereby impeded. This is one of the causes of the deterioration of the properties of the shift catalyst in the hydrogen producing apparatus with a large number of starts and stops of the apparatus. Especially in the Cu—Zn catalyst, which is highly active while in a reduced state, the reactivity is markedly deteriorated by the oxidation of the catalyst by water.

As described above, maintaining the catalytic activity also requires maximum reduction of water condensation.

The present invention solves the above-described problem with respect to the shifting section in the above-described conventional hydrogen producing apparatus, effectively decreases carbon monoxide in a hydrogen gas generated by fuel reforming, and aims to provide a hydrogen producing apparatus capable of supplying the hydrogen gas in a stable manner with a simple constitution.

Also, the present invention facilitates an activation process of the CO shift catalyst, eliminates the influence of oxygen inclusion when the start and stop operations are repeated, and aims to provide a hydrogen producing apparatus which can operate in a stable manner over a long period.

Further, the present invention suppresses water condensation in the shifting section upon the start of the hydrogen producing apparatus, thereby to reduce the start-up time of the apparatus, prevent activity deterioration of the shift catalyst, and realize stable supply of hydrogen.

DISCLOSURE OF INVENTION

The present invention provides a hydrogen producing apparatus comprising: a reforming section having a reforming catalyst which causes a reaction between a carbon-containing organic compound as a feedstock and water; a feedstock supply section for supplying the feedstock to the reforming section; a water supply section for supplying water to the reforming section; a heating section for heating the reforming catalyst; a shifting section having a shift catalyst which causes a shift reaction between carbon monoxide and water contained in a reformed gas supplied from the reforming section; and a purifying section having a purifying catalyst which causes oxidation or methanation of carbon monoxide contained in a gas supplied from the shifting section, wherein the shift catalyst comprises a platinum group metal and a metal oxide.

The metal oxide of the shift catalyst preferably comprises at least one of cerium oxides and zirconium oxides.

In a preferred embodiment of the present invention, the apparatus further comprises an oxygen gas supply section for supplying an oxygen gas to the shifted gas, and the catalyst of the purifying section comprises at least Pt and Ru.

The purifying catalyst preferably comprises a Pt—Ru alloy.

In another preferred embodiment of the present invention, the shifting section has a heating section for heating the shift catalyst, and the heating section is controlled such that the shift catalyst is heated to a temperature not lower than the dew point of the gas supplied from the reforming section to the shifting section.

In sill another preferred embodiment of the present invention, the apparatus further comprises an air supply section for supplying air to the gas supplied from the reforming section to the shifting section, and the amount of air supplied from the air supply section is controlled such that the temperature of the shift catalyst becomes not lower than the dew point of the gas.

In a preferred embodiment of the present invention, the apparatus further comprises a temperature detector for detecting the temperature of the catalyst of the shifting section and dew point controlling means for controlling the dew point of the gas supplied from the reforming section to the shifting section, wherein the reformed gas, of which dew point is lowered by the dew point controlling means, is supplied to the shifting section.

The dew point controlling means is an air supply section for supplying air to the reforming section together with the feedstock and water, and the dew point of the gas released from the reforming section is lowered by the air supplied from the air supply section to the reforming section.

In another preferred embodiment of the present invention, the shifting section is divided into plural catalytic reaction chambers each having the shifting catalyst, and at least one of a heat radiating part and a cooling part is provided between the catalytic reaction chambers.

In a first catalytic reaction chamber in the flowing direction of the reformed gas, the catalyst temperature is preferably retained at not lower than 300° C. and not higher than 450° C.

Of the plural catalytic reaction chambers, the catalyst temperature is preferably lower in a downstream chamber than in an upstream chamber in the flowing direction of the reformed gas.

Of the plural catalytic reaction chambers, the catalyst volume is preferably greater in a downstream chamber than in an upstream chamber in the flowing direction of the reformed gas.

Of the plural catalytic reaction chambers, the amount of the platinum group metal supported on the catalyst is preferably greater in a downstream chamber than in an upstream chamber in the flowing direction of the reformed gas.

Of the catalytic reaction chambers, the catalyst of at least one chamber of a second chamber and subsequent chambers preferably contains copper as a component.

A catalytic reaction chamber having a catalyst containing the platinum group metal is preferably provided downstream of the catalytic reaction chamber having the catalyst containing copper as a component.

A diffusing part or a mixing part of the reformed gas is preferably provided between the catalytic reaction chambers.

The apparatus preferably comprises a controlling section for controlling the operation of the cooling part on the basis of the temperature of the shift catalyst.

Heat collected by the cooling part is preferably used to heat at least one of the feedstock and water to be introduced to the reforming section and the reformed gas to be introduced to the shifting section.

BRIEF DESCRIPTION OF DRAWINGS

FIG. 1 is a longitudinal cross-sectional view schematically showing the constitution of a hydrogen producing apparatus in a first embodiment of the present invention.

FIG. 5 is a longitudinal cross-sectional view schematically showing the constitution of a shifting section of a hydrogen producing apparatus in a fifth embodiment of the present invention.

FIG. 6 is a graph showing the typical relationship between the operating temperature of a shift catalyst and the carbon monoxide concentration after passage of the catalyst.

FIG. 7 is a longitudinal cross-sectional view schematically showing the constitution of a shifting section of a hydrogen producing apparatus in a sixth embodiment of the present invention.

FIG. 8 is a longitudinal cross-sectional view schematically showing the constitution of a shifting section of a hydrogen producing apparatus in a seventh embodiment of the present invention.

BEST MODE FOR CARRYING OUT THE INVENTION

Figure 2:
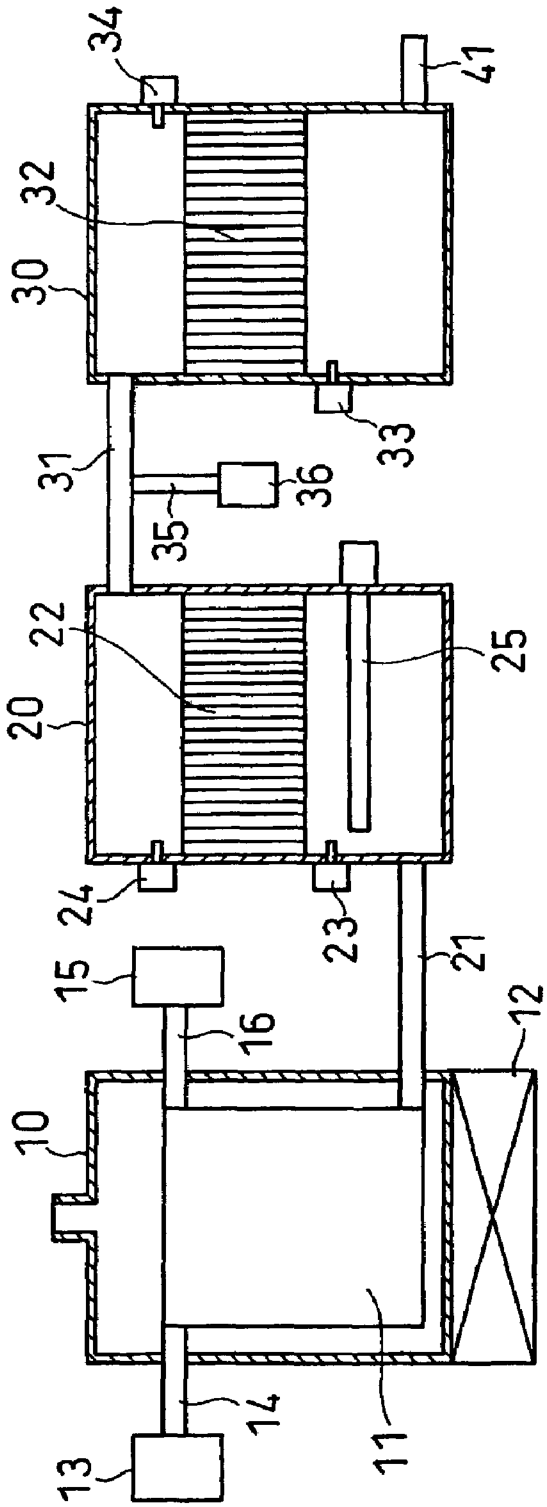
FIG. 2 is a longitudinal cross-sectional view schematically showing the constitution of a hydrogen producing apparatus in a second embodiment of the present invention.

In the following, embodiments of the present invention will be described in detail with reference to drawings.

Embodiment 1

FIG. 1 is a schematic view showing the constitution of a hydrogen producing apparatus in one embodiment of the present invention.

Numeral 10 represents a reforming section having a reforming chamber 11 in which a reforming catalyst is accommodated and a heating section 12 for heating the reforming chamber 11. The reforming catalyst is a platinum group metal supported on a pelletized catalyst carrier composed of alumina, for example, one marketed under the trade name of E catalyst by N. E. CHEMCAT Corporation. The heating section 12 is a flame burner which heats the catalyst of the reforming chamber to a temperature of 700 to 750° C. The heating section may be any heating means capable of heating to the intended temperature and is not limited to the flame burner. To the reforming chamber 11 of the reforming section 10, a feedstock composed mainly of hydrocarbon for steam reforming reaction is supplied from a feedstock supply section 13 through a feedstock supply conduit 14 and water is supplied from a water supply section 15 through a water supply conduit 16.

A shifting section 20 has a gas inlet connected to a gas outlet of the reforming section 10 by a gas conduit 21 and has a shift catalyst 22 inside. The shifting section further has a first temperature detector 23 for detecting the gas temperature on an inlet side and a second temperature detector 24 for detecting the gas temperature on an outlet side. The shift catalyst is a cerium oxide and platinum supported on a honeycomb-shaped catalyst carrier composed of cordierite.

A purifying section 30 has a gas inlet connected to a gas outlet of the shifting section 20 by a gas conduit 31 and has a purifying catalyst 32 inside. The purifying section further has a first temperature detector 33 for detecting the gas temperature on an inlet side and a second temperature detector 34 for detecting the gas temperature on an outlet side. The purifying catalyst is platinum and ruthenium supported on a honeycomb-shaped catalyst carrier composed of cordierite. A gas conduit 41 provided at an outlet of the purifying section 30 supplies hydrogen to a fuel cell system or the like. The gas conduit 31 is connected to an air supply section 36 by a gas conduit 35, and air is supplied to the gas conduit 31 from the air supply section.

Next, operation of the hydrogen producing apparatus of this embodiment will be explained.

The heating section 12 is operated to heat the reforming catalyst in the reforming chamber 11. The feedstock hydrocarbon and water are supplied to the reforming chamber 11 from the feedstock supply section 13 and the water supply section 15, respectively, to cause a steam reforming reaction to proceed. The reformed gas is supplied through the gas conduit 21 to the shifting section 20 to cause a shift reaction to proceed, and the shifted gas is supplied through the gas conduit 31 to the purifying section 30. At this time, air is supplied from the air supply section 36 to the gas conduit 31, and the air is mixed with the shifted gas. The gas purified in the purifying section 30 is supplied to outside through the gas conduit 41.

One of the characteristics of this embodiment is the use of the cerium oxide and Pt for the catalyst of the shifting section 20. This catalyst enables a large reduction of carbon monoxide in comparison with a Fe—Cr based catalyst used at a relatively high temperature. Also, in comparison with the Cu—Zn based catalyst used conventionally, this catalyst is characterized by having resistance to high temperature and resistance to deterioration in catalytic activity caused by repetition of oxidation and reduction. However, it is slightly inferior in low temperature activity to the Cu—Zn based catalyst whose activity has not deteriorated. Thus, the carbon monoxide concentration tends to become high at the outlet of the shifting section. The increase of the carbon monoxide concentration leads to an increase of load in the purifying section. Consequently, the purifying section using a conventional Pt-based or Ru-based catalyst becomes unable to purify sufficiently in some cases.

In the Pt-based purifying catalyst, the catalytic activity at low temperatures deteriorates with increase of carbon monoxide concentration. Also, with the increase of carbon monoxide concentration, there is a need to increase the amount of oxygen introduced to the purifying section. In the case of the operation under the conditions suitable for the carbon monoxide concentration, there arises a need, eventually, to make the catalyst temperature high. When the catalyst temperature becomes high, however, carbon dioxide reacts with hydrogen to produce carbon monoxide and water, thereby making it impossible to decrease the carbon monoxide concentration sufficiently.

The Ru-based purifying catalyst causes a methanation reaction of carbon oxide and hydrogen, which is a reaction of decreasing carbon monoxide. Also, a methanation reaction of carbon dioxide and hydrogen proceeds simultaneously. Since these reactions are both exothermic, the reactions proceed rapidly when the catalyst temperature becomes higher than a certain temperature. Since the Ru-based purifying catalyst also causes an oxidation reaction to decrease carbon monoxide, the amount of oxygen introduced to the purifying section needs to be increased with increase of carbon monoxide concentration, so that the catalyst temperature becomes high to some extent. With the increase of catalyst temperature and carbon monoxide concentration, the methanation reactions proceed to make the catalyst temperature high, so that the carbon monoxide concentration may be eventually increased in some cases.

Therefore, the present invention uses the Pt catalyst and the Ru catalyst for the purifying section. In the Pt catalyst, the catalytic activity deteriorates at low temperatures with increase of carbon monoxide concentration. On the other hand, the Ru catalyst is active for oxidation reaction of carbon monoxide even at relatively low temperatures. Thus, when the Pt catalyst and the Ru catalyst are combined, the Ru catalyst causes carbon monoxide to react to some extent and the amount of carbon monoxide adsorbed on the Pt catalyst is therefore reduced, so that the catalytic activity for oxidation reaction of carbon monoxide is retained. This makes it possible to decrease a high concentration of carbon monoxide even at relatively low temperatures in comparison with the use of only the Pt catalyst. When the catalyst temperature is high, on the other hand, the oxidation reaction of carbon monoxide by the Pt catalyst is more likely to occur so that the methanation reaction by the Ru catalyst is less likely to occur. When the methanation reaction and the oxidation reaction of carbon monoxide are compared, the oxidation reaction of carbon monoxide is less exothermic; therefore, it is possible to suppress heat generation over the catalyst and thereby prevent the vicious circle that the increase of the catalyst temperature causes the methanation reaction to proceed.

As described above, the hydrogen producing apparatus of the present invention enables reduction of carbon monoxide even at relatively low temperatures; thus, even if oxygen is supplied in an amount suitable for oxidation of a high concentration of carbon monoxide, the catalyst temperature does not become high eventually, so that it is possible to decrease carbon monoxide.

This embodiment is characterized by the use of the cerium oxide and Pt for the catalyst of the shifting section. As described above, there is a problem specific to this catalyst that the carbon monoxide concentration becomes relatively high at the outlet of the shifting section in comparison with the conventional shift catalysts. In order to solve this problem, this embodiment has a special constitution that the shifting section as described above is connected to the purifying section having the catalyst composed of the combination of the Pt catalyst and the Ru catalyst. Thus, in order to effectively decrease a high concentration of carbon monoxide, it is necessary to widen the temperature range in which the catalyst of the purifying section can be used.

In the following, the combination ratio of the Pt catalyst and the Ru catalyst will be described.

When the ratio of the Ru catalyst is high, the methanation is more likely to proceed and the upper limit of catalyst operating temperature therefore becomes low. When the ratio of the Ru catalyst is low, on the other hand, the activity of the Pt catalyst cannot be retained at low temperatures and the lower limit of catalyst operating temperature therefore becomes high.

When the carbon monoxide concentration is relatively low at the outlet of the shifting section, the amount of Ru catalyst is reduced to raise the upper limit of operating temperature at high temperatures. When the carbon monoxide concentration is relatively high, the amount of Ru catalyst is increased to lower the lower limit of operating temperature at low temperatures.

In consideration of the reactivity at low temperatures and high temperatures, the number of Ru atoms of the purifying catalyst including Pt and Ru is desirably set in a range of not less than one tenth and not more than 1 of the number of Pt atoms. Also, the use of the catalyst comprising a Pt—Ru alloy allows the catalyst operating temperature range to become wider, making it possible to successfully deal with a high concentration of carbon monoxide. In the use of the Pt—Ru alloy, where Pt and Ru catalysts exist in closer vicinity, carbon monoxide is consumed more effectively over the Ru catalyst and the activity of the Pt catalyst is therefore more likely to be retained at low temperatures. At high temperatures, the methanation reactions are suppressed more effectively than in the use of the catalyst composed of only Ru.

Further, combination of the Rh catalyst and the Pt catalyst also produces the same effects as the Ru catalyst. This is because the Rh catalyst is also active for oxidation reaction of carbon monoxide even at low temperatures.

This embodiment used a cerium oxide as the metal oxide in combination with the Pt catalyst to constitute the shift catalyst, but the metal oxide is not limited to the cerium oxide. For example, a metal oxide of Zr, Zn or the like exhibits catalytic activity for the shift reaction when combined with the Pt catalyst. Further, the platinum group metal catalyst is not limited to Pt, and other platinum group metals such as Ru, Pd and Rh may also be applicable.

EXAMPLE 1

The following will describe an example of the operation of the hydrogen producing apparatus of Embodiment 1.

Methane gas was used as the feedstock, and 1 mol of methane gas was added with 2.5 mol of water and was steam reformed. The resultant outlet gas in the reforming section 10 was a hydrogen gas containing about 10% of carbon monoxide and about 10% of carbon dioxide. When this hydrogen producing apparatus was operated in a steady manner, the carbon monoxide concentration of the outlet gas of the shifting section 20 was about 1%. At this time, the temperatures of the shift catalyst upstream and downstream of the hydrogen gas flow were detected by the first temperature detector 23 and the second temperature detector 24 to examine if the shifting section was kept at a temperature capable of decreasing carbon monoxide effectively.

Air was added to this hydrogen gas from the air supply section 36 such that the amount of oxygen contained in the air became four times the amount of oxygen necessary for oxidation reaction of carbon monoxide, and the resultant gas was supplied to the purifying section 30 having the purifying catalyst composed of the combination of the Pt catalyst and the Ru catalyst. At this time, the temperatures of the purifying catalyst upstream and downstream of the hydrogen gas flow were detected by the first temperature detector 33 and the second temperature detector 34 to find the state of the purifying catalyst. As a result, when the temperature of the first temperature detector 33 was in a range of about 80 to 120° C., the carbon monoxide concentration of the outlet hydrogen gas was successfully reduced to 20 ppm or lower. At this time, the second temperature detector was about 150 to 190° C. due to heat generation caused by oxidation.

In a hydrogen producing apparatus having the same constitution as the above apparatus except for the use of the Pt catalyst for the catalyst of the purifying section, when the temperature of the first temperature detector in the purifying section was 80° C., reduction of carbon monoxide was not possible, and when it was in a temperature range of about 110 to 120° C., the carbon monoxide concentration at the outlet could be reduced to 20 ppm or lower.

In the case of using the Ru catalyst for the catalyst of the purifying section, the carbon monoxide concentration at the outlet could be reduced to 20 ppm or lower only when the temperature of the first temperature detector in the purifying section was in a range of about 80 to 110° C. When it was 110° C. or higher, the outlet temperature became high due to increased heat generation caused by the methanation reaction, thereby making it impossible to decrease the carbon monoxide.

These results demonstrate that the purifying catalyst composed of the combination of the Pt catalyst and the Ru catalyst has a large range of catalyst operating temperature and effective reduction of a high concentration of carbon monoxide is therefore possible.

Embodiment 2

FIG. 2 shows the constitution of a hydrogen producing apparatus of this embodiment.

The difference from FIG. 1 is that a heater 25 is provided as heating means in the shifting section 20. The heater 25, which is, for example, an electric heater, minimizes condensation of water especially in the shifting section when the apparatus is started, shortens the start-up time, and allows the activity of the shift catalyst to be maintained.

The dew point of the reformed gas can be calculated on the basis of the amounts of the feedstock and water supplied. For example, when the feedstock is methane and water is supplied in an amount three times the number of moles of the methane, provided that 100% of the methane is steam reformed into carbon dioxide and hydrogen, the steam partial pressure of the gas after the reforming reaction becomes one sixth from the reaction formula. Thus, the dew point of the gas can be easily calculated.

According to the present invention, the operation of the heater 25 is controlled such that the temperature of the gas before and after the shift catalyst detected by the first temperature detector 23 and the second temperature detector 24 of the shifting section becomes a temperature not lower than the dew point. This makes it possible to prevent condensation of water in the shifting section, to shorten the start-up time of the apparatus, and to prevent deterioration of the properties of the shift catalyst. Further, in the steady operation, the respective sections of the apparatus including the shifting section are eventually heated to a temperature not lower than the steam dew point by the heat contained in the reformed gas, so that condensation of water does not occur in the apparatus and stable supply of hydrogen therefore becomes possible.

Embodiment 3

Figure 3:
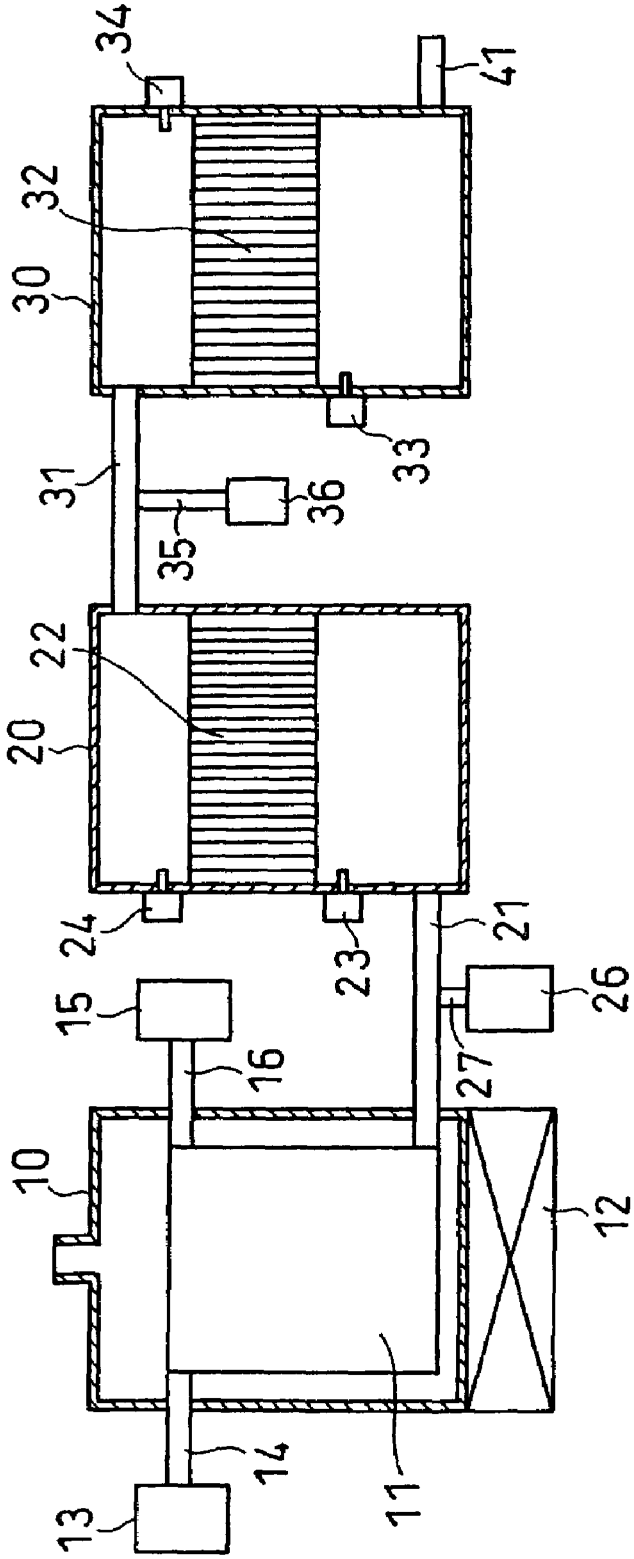
FIG. 3 is a longitudinal cross-sectional view schematically showing the constitution of a hydrogen producing apparatus in a third embodiment of the present invention.

FIG. 3 shows the constitution of a hydrogen producing apparatus of this embodiment. The apparatus has almost the same constitution as that of Embodiment 2 except that the heater 25 is removed from the shifting section and an air supply section 26 is connected to the gas conduit 21 through a gas conduit 27.

In this embodiment, the air supply section 26 supplies air to the reformed gas to heat the shifting section and the shift catalyst. Also, in the use of the shift catalyst of the present invention, oxygen in the supplied air oxidizes part of the reformed gas component readily, and heat is generated upon the oxidation to heat the shifting section and the shift catalyst.

Accordingly, in the same manner as in Embodiment 2, this embodiment makes it possible to heat the shifting section to prevent water condensation in the shifting section, to shorten the start-up time of the apparatus, and to prevent deterioration of the properties of the shift catalyst. Further, it is possible to control the oxidation reaction over the shift catalyst, that is, the amount of heat generation, by the amount of air supplied, so that the catalyst temperature can be controlled easily.

Embodiment 4

Figure 4:
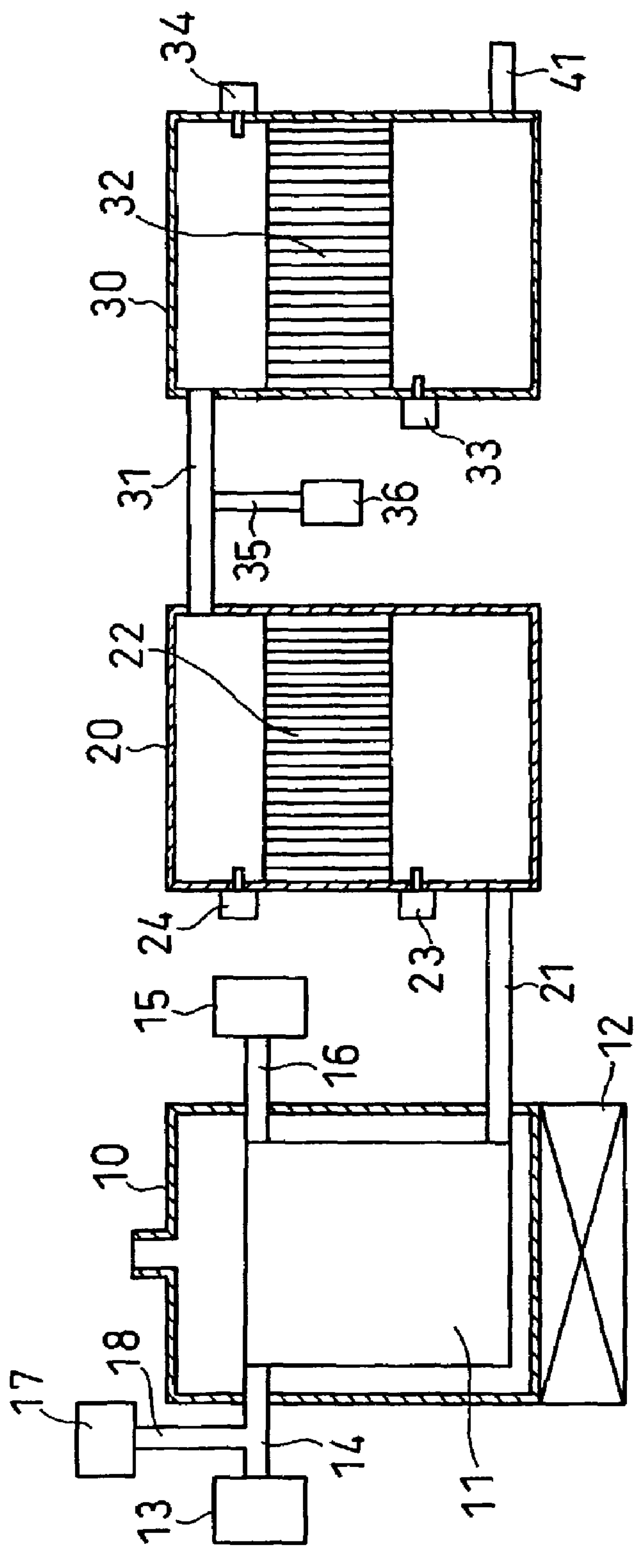
FIG. 4 is a longitudinal cross-sectional view schematically showing the constitution of a hydrogen producing apparatus in a fourth embodiment of the present invention.

FIG. 4 shows the constitution of a hydrogen producing apparatus of this embodiment. The apparatus has almost the same constitution as that of Embodiment 2 except that the heater 25 is removed from the shifting section and an air supply section 17 is connected to the feedstock supply conduit 14 through a gas conduit 18.

In this embodiment, as means for suppressing water condensation, the feedstock is mixed with air and supplied to the reforming catalyst. The air is supplied to the feedstock gas to oxidize part of the feedstock, so that the amount of water necessary for the reforming reaction can be reduced, and the dew point of the reformed gas can be lowered by nitrogen in the air. As a result, the amount of water condensation can be reduced in the respective sections of the apparatus. Further, the nitrogen gas in the air increases the gas flow rate to increase the amount of heat contained in the gas, so that the respective sections can be heated promptly.

The reforming catalyst is heated both by the heating section 12 and by heat generated upon the oxidation of part of the feedstock over the reforming catalyst by the air supplied.

It is noted that the Cu—Zn based catalyst, which is conventionally used as the shift catalyst, is not suited for this embodiment. In this embodiment, heating is performed by introducing air, and the Cu—Zn based catalyst is not preferable since the activity of this catalyst is lowered due to oxidation by air. In view of this, it is preferable to use a platinum group metal whose catalytic activity is hardly lowered due to oxidation/reduction, particularly Pt or Rh, and a metal oxide such as cerium oxide, zirconium oxide or zinc oxide for the shift catalyst.

EXAMPLE 2

The following will describe an example of the operation of the hydrogen producing apparatus of Embodiment 2.

First, upon the start of the apparatus, the heating section 12 was operated to start the heating of the reforming chamber 11. Subsequently, 1 mol of feedstock methane gas was added with 2.5 mol of water and supplied to the reforming chamber 11 of the reforming section. The flow rate of the methane was set at 300L/hour. The amount of heating by the heating section 12 was controlled such that the temperature of the reforming catalyst became 700° C., and the steam reforming reaction was allowed to proceed.

Immediately after the start of the apparatus, since the temperatures of the respective sections including the shifting section 20 are almost close to room temperature, water condensation takes place. The dew point of the reformed gas is about 45° C. In order to prevent water condensation in the shifting section, the heater 25 was operated such that the gas temperatures detected by the first temperature detector 23 and the second temperature detector 24 became not lower than 45° C. This enabled prevention of water condensation in the shifting section, especially over the catalyst. The power consumption of the heater 25 was then about 100 W.

During the steady operation, in order to effectively decrease the carbon monoxide in the reformed gas supplied to the shifting section by the shift reaction with water, the heater was operated such that the temperature inside the shifting section became about 300° C. Without the operation of the heater 25, it took about 60 minutes for the temperature of the shifting section to rise to about 300° C. at which the operation became stable, but this time was successfully shortened to about 30 minutes by operating the heater 25.

It is noted that this operation time varies depending on the size of the apparatus, the supply amount of feedstock and the controlling temperature of the heater.

Since the temperature of the reformed gas becomes about 700° C. during the steady operation, this heat was utilized to sequentially heat the respective sections of the apparatus, so that the shifting section could be operated in a stable manner.

EXAMPLE 3

The following will describe an example of the operation of the hydrogen producing apparatus of Embodiment 3.

The apparatus was operated in almost the same manner as in Example 2. Air was supplied to the reformed gas from the air supply section 26 at 60 L/hour to oxidize the reformed gas over the shift catalyst, and the shift catalyst was heated by heat generated upon the oxidation. The amount of air supplied to the shifting section needs to be set depending on the amount of hydrogen to be generated. With respect to the amount of heat generation, when air is supplied at 60 L/hour, heat of about 320 kj/hour is expected to be generated. This corresponds to a heater with a heat generation of about 89 W. Thus, this embodiment without the heater 25 could achieve the start-up time equivalent to that of Example 2.

Since a large amount of hydrogen is contained in the gas reformed by the steam reforming reaction of hydrocarbon, it is possible to cause the oxidation reaction to proceed smoothly even at low temperatures right after the start.

In this embodiment, the amount of air supplied from the air supply section 26 was controlled such that the oxygen concentration became 4% or less in consideration of the explosion limit concentration of the hydrogen gas in the reformed gas.

EXAMPLE 4

The following will describe an example of the operation of the hydrogen producing apparatus of Embodiment 4.

The apparatus was operated under almost the same conditions as in Example 2. However, upon the start, air was supplied to the feedstock methane before it was introduced into the reforming section 10 to oxidize the feedstock methane, the amount of the air being about one fourth of the amount necessary for complete oxidation of the feedstock. Provided that one fourth of the methane was oxidized since the oxidation of methane takes precedence over the steam reforming reaction, water was supplied such that the molar amount of water including the water generated by the oxidation corresponded to 2.5 times that of the remaining methane.

By supplying air to the feedstock before the introduction into the reforming section, the dew point of the reformed gas becomes about 40° C., so that water condensation is less likely to occur than the case without air introduction. Further, the introduction of air increases the amount of gas, and the nitrogen gas in the air increases the gas flow rate to increase the amount of heat contained in the gas, so that the respective sections are heated more promptly. Consequently, it took about 30 minutes for the temperature of the shifting section to rise to about 300° C. in Example 2, but this example succeeded in shortening the time to about 25 minutes.

With regard to the air supply from the air supply section 17, even if it is conducted during the steady operation as well as at the start of the apparatus, a large problem does not occur. Although this example used methane as the feedstock hydrocarbon, it is possible to use any carbon-containing organic compound commonly used as the feedstock of the steam reforming, for example, natural gas, hydrocarbon such as LPG, alcohol such as methanol, or naphtha.

EXAMPLE 5

The shift catalyst used in the example of the present invention was prepared as follows. A powder of cerium oxide $CeO_2$ was impregnated with an aqueous solution of chloroplatinic acid and was subjected to a heating treatment of about 500° C. to cause the $CeO_2$ to support 3 wt % Pt. The $CeO_2$ with Pt supported thereon was coated to a honeycomb-shaped catalyst carrier composed of cordierite having a diameter of 100 mm and a length of 50 mm, to prepare the shift catalyst.

As a comparative example, a Cu—Zn catalyst was used in place of the $CeO_2$ with Pt supported thereon. When the $PtCeO_2$ catalyst was used, deterioration of the catalytic activity of the shift catalyst was hardly observed even after start and stop were repeated 10 times or more. This is because the Pt—$CeO_2$ catalyst is hardly affected by the deterioration of the activity caused by oxidation.

On the other hand, in the use of the Cu—Zn catalyst, when start and stop of the apparatus were repeated 10 times or more, the carbon monoxide concentration of the shifted gas became twice in comparison with that of the first start, showing deterioration of the catalytic activity. This is because the catalyst is oxidized during the stop and is therefore deteriorated in activity.

As described above, the Pt—$CeO_2$ catalyst of the present invention is less susceptible to deterioration in catalytic activity than the conventional Cu—Zn catalyst. This appears to be mainly due to the difference in carbon monoxide adsorbing property between Pt and Cu. That is, Pt is less likely to sinter due to oxidation. In contrast, Cu is more likely to sinter due to oxidation than Pt, and the carbon monoxide adsorbing property is deteriorated consequently. The oxidation of the catalyst takes place upon air introduction or water condensation.

EXAMPLE 6

A comparison of the properties of the shift catalyst was made between the Pt—$CeO_2$ catalyst and the Rh—$CeO_2$ catalyst using the apparatus of FIG. 2.

The basic properties of the Rh—$CeO_2$ catalyst as the shift catalyst are hardly affected by deterioration in catalytic activity due to oxidation, so the Rh—$CeO_2$ catalyst showed properties almost equivalent to the Pt—$CeO_2$ catalyst. In the case of the Rh—$CeO_2$ catalyst, however, the concentration of methane in the shifted gas was slightly increased, since it has better activity for the methanation reaction of hydrogen and carbon dioxide or carbon monoxide than the Pt—$CeO_2$ catalyst.

In a comparison at a catalyst temperature of 300° C., the methane concentration of the shifted gas was 0.1% (on a basis of dry gas) for the Pt—$CeO_2$ catalyst as opposed to 0.2% (on a basis of dry gas) for the Rh—$CeO_2$ catalyst. However, the carbon monoxide concentration at the outlet was retained at an almost constant value. Since this extent of increase in methane concentration presents no practical problem, the Rh—$CeO_2$ catalyst can also be used as the shift catalyst.

In addition, it was confirmed that only this combination of the Pt and Rh catalysts did not exhibit the catalytic activity and that other platinum metal Ru or Pd also exhibited similar activity for shift reaction although the properties slightly varied depending on the metal.

EXAMPLE 7

Various shift catalysts were examined for their activities for shift reaction. As a result, it was confirmed that a catalyst prepared by using $ZrO_2$, ZnO, or a mixture or solid solution of $CeO_2$ with one of these oxides as the metal oxide could serve as the shift catalyst having excellent oxidation resistance that the Cu—Zn catalyst is lacking in. The activity for shift reaction, however, varied slightly depending on the metal oxide. For example, when $ZrO_2$ was used, the methanation reaction of hydrogen and carbon dioxide or carbon monoxide was facilitated, so that the methane concentration at the outlet of the shifting section tended to increase slightly. Although it may differ according to the condition under which the catalyst is used, in a comparison at a catalyst temperature of 300° C., the methane concentration at the outlet of the shifting section was 0.1% (on a basis of dry gas) for the Pt—$CeO_2$ catalyst as opposed to 0.15% (on a basis of dry gas) for the Pt—$ZrO_2$ catalyst. Also, when ZnO was used, the activity for shift catalyst was improved at low temperatures since it is superior in donating oxygen at low temperatures to $CeO_2$; however, when it was used at high temperatures such as 500° C. or higher, the catalytic activity tended to deteriorate since the reducing tendency of the Zn oxide increases.

Embodiment 5

FIG. 5 is a longitudinal cross-sectional view schematically showing the constitution of a shifting section of a hydrogen producing apparatus according to this embodiment.

A shifting section 50 is composed of a first reaction chamber 51, a second reaction chamber 52 and a narrowed part 53 connecting both chambers, and the first reaction chamber 51 and the second reaction chamber 52 are provided with a first catalyst 61 and a second catalyst 62, respectively. Diffusing plates 63 and 64 are provided upstream of these catalysts, respectively. The first reaction chamber 51 has a reformed gas inlet 55 connected to the reforming section 10, and the second reaction chamber 52 has a shifted gas outlet 56 connected to the purifying section 30. In order to keep the reaction chambers at a constant temperature, the outer surfaces are covered, where necessary, with a heat insulating material 54 composed of ceramic wool.

The following will describe an example that a reformed gas obtained by steam reforming natural gas in the reforming section 10 is supplied to the shifting section.

The composition of the gas obtained by steam reforming natural gas varies according to the reaction temperature over the reforming catalyst, but its average composition excluding steam is comprised of about 80% hydrogen, about 10% carbon dioxide and about 10% carbon monoxide. The reformed gas introduced from the inlet 55 first reacts over the first catalyst 61 so that the CO concentration is decreased to 1 to 2%. The reformed gas having passed through the first catalyst reacts over the second catalyst 62 until the CO concentration becomes about 0.1 to 0.8%, is discharged from the outlet 56 to the purifying section 30 or the like, and is supplied to a fuel cell or the like.

Next, a description will be given on the principle of the operation of this apparatus. The CO shift reaction is an equilibrium reaction dependent on the temperature, and in theory of equilibrium, the lower the reaction temperature becomes, the larger the reduction of the CO concentration becomes. However, since the reaction rate over the catalyst is low at low temperatures, the CO shift catalyst exhibits properties that the CO concentration verses temperature goes through the minimum, as shown by the solid line of FIG. 6. Thus, the higher the catalytic activity becomes at low temperatures, the lower the CO concentration becomes. Generally speaking, a copper-based catalyst used as the CO shift catalyst, such as a copper-zinc catalyst or a copper-chromium catalyst, has high activity at low temperatures and is capable of the CO shift reaction at about 150 to 300° C., so that the CO concentration can be reduced from a few hundred to a few thousand ppm. The copper-based catalyst, however, needs to be activated after being charged to a reaction vessel by passing a reducing gas such as hydrogen or reformed gas as an initial operation. Also, the copper-based catalyst has a low thermal resistance to about 300° C.; therefore, in order to prevent the catalyst temperature from exceeding this withstand temperature due to the reaction heat generated upon the activation, the reducing gas is supplied in a diluted state or in a small amount such that the reaction proceeds gradually. The copper content of the catalyst also has an influence on the time required for the activation. Ensuring life reliability would require a copper content of a few ten wt %, thereby necessitating a long time for the activation.

Also, in the CO shift reaction, gas velocity per catalyst volume (space velocity: SV) normally needs to be not more than 1000 per hour, requiring a large amount of catalyst and thereby an increased thermal capacity; it thus takes a long time to raise the temperature of the catalyst when the apparatus is started. Therefore, heating may be performed from outside the reaction chamber, for example, by an electric heater, or the temperature of the reformed gas supplied may be heightened, in order to speed up the temperature rise. However, since the copper-based catalyst has a low thermal resistance, such rapid heating as to cause a local temperature rise is not desirable.

When the apparatus is stopped, the internal pressure of the reaction chamber decreases with decrease of the temperature of the apparatus, to allow a small amount of air to get in from outside. Thus, when the apparatus is stopped and started repeatedly over a long period, the copper-based catalyst is gradually deteriorated. This necessitates a means for preventing air inclusion or the like and makes the apparatus more complicated.

On the other hand, as in the apparatus of the present invention, when the platinum metal group catalyst is used as the CO shift catalyst, the long-time activation and reducing treatment are unnecessary. Also, since this catalyst has high thermal resistance, no problem occurs even when the temperature rises to about 500° C. locally at the time of the start; thus, rapid heating is possible by supplying a high temperature reformed gas and prompt start-up of the apparatus is therefore possible. Further, since this catalyst is resistant to deterioration even if a small amount of air is included, there is no need for specific means such as oxidation preventing means.

The properties of the CO shift reaction are influenced by temperature distribution of the shift catalyst from the upstream to the downstream. The temperature of the upstream, where the CO concentration is high, is preferably high since the reaction rate is high at high temperatures, whereas the temperature of the downstream, where the equilibrium CO concentration is influential, is desirably low. Thus, as in this apparatus, when the CO shift catalyst is divided and accommodated into plural chambers with a heat radiating part or a cooling part disposed between the chambers to control the amount of heat radiation or cooling, the CO can be decreased with a smaller amount of catalyst.

Further, the higher the temperature is, the greater the space velocity becomes, but when the temperature gets too high, the reverse reaction of the reforming reaction begins to proceed to generate methane, so that the amount of hydrogen in the reformed gas is lowered, affecting the efficiency of the apparatus. Thus, the temperature of the first catalyst is preferably not higher than 450° C. On the other hand, when the temperature of the first catalyst is low, the space velocity needs to be decreased, and therefore the temperature of the first catalyst is preferably not lower than 300° C. The temperature of the first catalyst could be made lower than 300° C. if the space velocity is decreased; however, this makes the temperature difference between the first catalyst and the second catalyst small, so that dividing the catalyst into plural chambers may become less effective and the volume of the reaction vessel may become larger due to the division.

When the temperature of the second catalyst is higher than that of the first catalyst, the CO which has been reduced by the first catalyst is increased again by the reverse reaction, and therefore the temperature of the second catalyst is preferably lower than that of the first catalyst. This also applies to the case where the number of the catalyst chambers is three or more.

The lower the space velocity is, the higher the properties become when the catalyst temperature is low, whereas the higher the space velocity is, the more unlikely the methanation proceeds at high temperatures. Thus, the volume of the catalyst of the upper chamber is preferably smaller than that of the catalyst of the lower chamber.

The CO shift catalyst preferably contains a cerium oxide and platinum to produce high properties. The particle size of the cerium oxide is preferably 0.1 to 15 $\mu$m, and if the particle size is larger than this range, dispersion property of the platinum is lowered, which may lead to insufficient properties. When the particle size is smaller than 0.1 $\mu$m, separation from the honeycomb-shaped catalyst carrier, collapse of pellets or the like may occur, and the life characteristics are likely to deteriorate.

A diffusing part or a mixing part is preferably disposed between the chambers of the catalyst. The CO shift catalyst having a large volume tends to have temperature distribution in its cross-sectional direction, so variations in CO concentration may occur after passage of the catalyst between the central part and the outer part. Thus, by providing the mixing part or the diffusing part, the catalyst of the lower chamber functions effectively, so that higher properties can be obtained.

The amount of platinum group metal supported on the shift catalyst is preferably larger in the lower chamber than in the upper chamber. When the amount of platinum group metal supported is large, methanation is likely to proceed, and this tendency is evident in the upper chamber where the catalyst temperature is high. On the other hand, the activity is improved at low temperatures when the amount of platinum group metal supported is increased. Thus, by increasing the amount of platinum group metal supported on the catalyst of the lower chamber where the methanation reaction is less likely to proceed, higher properties can be obtained with a smaller volume of catalyst.

This embodiment used platinum supported on a cerium oxide as the platinum group metal catalyst, but it is also possible to use a platinum group metal such as rhodium, palladium or ruthenium supported on a carrier of alumina, zirconium oxide, magnesium oxide, zinc oxide, titanium oxide or silicone oxide.

In this embodiment, the honeycomb-shaped carrier composed of cordierite was coated with the cerium oxide supporting a platinum salt to produce the CO shift catalyst, but palletized alumina may also be used to support the catalyst to produce the CO shift catalyst. Also, metal such as stainless steel or ceramic wool may be used as the honeycomb-shaped carrier.

Embodiment 6

In a shifting section 50*a* of this embodiment, the narrowed part 53 connecting the first reaction chamber 51 and the second reaction chamber 52 is provided with a cooling water supply conduit 57 as shown in FIG. 7.

Since the CO shift reaction is an equilibrium reaction, when the ratio of reactant steam is large, more CO reduction is possible. By providing the cooling part with the cooling water supply conduit 57, the gas to be introduced to the second reaction chamber can be cooled by the latent heat of water evaporation, and further, the equilibrium in the CO shift reaction can be shifted advantageously, so that the CO can be reduced more effectively.

Embodiment 7

In a shifting section 50*b* of this embodiment, the part connecting the first reaction chamber 51 and the second reaction chamber 52 is comprised of plural pipes 53*b* and is provided with a cooling fan 58, as shown in FIG. 8.

Although the cooling efficiency depends on the surface area of the pipes, since the connecting part of this embodiment is comprised of the plural parts, effective cooling is possible, and the length of the connecting parts can be shortened and the apparatus can therefore be downsized. Also, the provision of the cooling fun 58 enables more effective cooling. By providing a device for detecting the temperature of the second catalyst 62 and a controlling unit for controlling the operation or the number of revolutions of the cooling fun 58 on the basis of the detected temperature, the catalyst temperature can be constantly maintained at an optimum value. Further, air heated by heat-exchange at the cooling part can be utilized as air to be supplied to a combustion section for heating the reforming section, or can be utilized to heat the feedstock or water used for the reforming, whereby the efficiency of the apparatus can be improved.

Embodiment 8

This embodiment uses, as the second catalyst 62 of FIG. 7, a copper-based catalyst, for example, a honeycomb-shaped catalyst carrier composed of cordierite coated with a cooper-based catalyst. Herein, the copper-based catalyst refers to a CO shift catalyst containing copper as a component of its activity and is, for example, a copper-zinc catalyst, a copper-chromium catalyst, or a copper-zinc or copper-chromium based catalyst with alumina, silica, zirconium or the like added thereto. The provision of the copper-based catalyst capable of the CO shift reaction at low temperatures enables more reduction of the CO concentration of the gas having passed through the second chamber. Further, since the first chamber is provided with the platinum group metal catalyst having high thermal resistance, the copper-based catalyst having relatively low thermal resistance is prevented from being exposed to high temperatures at the time of the start, and the influence of the deterioration is decreased.

It is preferable to further provide the platinum group metal catalyst downstream of the copper-based catalyst. When the apparatus is suspended or stopped for a long term, a small amount of air may get in the apparatus from outside, and the inclusion of air causes the copper-based catalyst to deteriorate gradually. Onto the platinum group metal catalyst, hydrogen or CO is adsorbed even while the apparatus is stopped; thus, when the platinum group metal catalyst is provided upstream and downstream so as to sandwich the copper-based catalyst, the small amount of oxygen is consumed over the platinum group metal catalyst and the deterioration of the copper-based catalyst can therefore be suppressed.

EXAMPLE 8

The first catalyst and the second catalyst were produced by coating honeycomb-shaped carriers composed of cordierite having the same diameter but having a length of 20 mm and 60 mm, respectively, with a powder of cerium oxide having a particle size of 15 μm with platinum supported thereon, and were disposed in the first chamber 51 and the second chamber 52, respectively. A reformed gas consisting of carbon monoxide (8%), carbon dioxide (8%), steam (20%), and hydrogen (balance) was introduced from the reformed gas inlet 55 at a flow rate of 10 liter per minute. The temperatures of the first catalyst and the second catalyst were controlled to become 400° C. and 250° C., respectively, and the CO concentration of the gas released from the shifted gas outlet 56 was measured by gas chromatography and was turned out to be 3000 ppm. Subsequently, after the gas of the reaction chamber was replaced with nitrogen, air was supplied, and the reformed gas was supplied again; the CO concentration of the outlet gas was measured and was turned out to be 3000 ppm. Further, the same operations were repeated 50 times, and the CO concentration was measured in the same manner and was turned out to be 3200 ppm.

EXAMPLE 9

In the same manner as in Example 8, the CO concentration of the gas released from the shifted gas outlet 56 was measured by varying the temperature of the first catalyst of Example 8 to 250° C., 275° C., 300° C., 400° C., 450° C. and 475° C., and it was turned out to be 7000 ppm, 7200 ppm, 3100 ppm, 3000 ppm, 3100 ppm and 3500 ppm. The methane concentration of the gas was also measured, and as a result, no methane was detected at 400° C. or lower, and it was 0.5% at 450° C. and 1.1% at 475° C.

EXAMPLE 10

In the same manner as in Example 8 except for the use of powders of a cerium oxide having a particle size of 0.05 μm, 0.1 μm, 5 μm, 15 μm and 17 μm, respectively, the CO concentration of the outlet gas was measured and was turned out to be 2900 ppm, 3000 ppm, 3400 ppm, 3500 ppm and 5000 ppm. Subsequently, after the gas of the reaction chamber was replaced with nitrogen, air was supplied, and the reformed gas was supplied again; the CO concentration of the outlet gas was measured and was turned out to be 3800 ppm, 3000 ppm, 3400 ppm, 3500 ppm and 5100 ppm. Further, the same operations were repeated 50 times, and the CO concentration was measured in the same manner and was turned out to be 9000 ppm, 3100 ppm, 3500 ppm, 3600 ppm and 8000 ppm.

COMPARATIVE EXAMPLE 1

Without dividing the reaction chamber, one reaction chamber was used and was provided with a catalyst comprising the same catalyst as that of Example 8 supported on a carrier having a length of 80 mm. Under the same conditions as those of Example 8, the CO concentration of the outlet gas was measured, and the minimum value was turned out to be 7000 ppm. Subsequently, after the gas of the reaction chamber was replaced with nitrogen, air was supplied, and the reformed gas was supplied again; the CO concentration of the outlet gas was measured at the same temperatures and was turned out to be 7100 ppm. Further, the same operations were repeated 50 times, and the CO concentration was measured in the same manner and was turned out to be 7200 ppm.

COMPARATIVE EXAMPLE 2

By providing a copper-zinc catalyst in place of the platinum catalyst of the Comparative Example 1, the measurement was conducted in the same manner, and the CO concentration of the outlet gas was turned out to be 1000 ppm. Subsequently, after the gas of the reaction chamber was replaced with nitrogen, air was supplied, and the reformed gas was supplied again; the CO concentration of the outlet gas was measured and was turned out to be 200 ppm. Further, the same operations were repeated 50 times, and the CO concentration was measured in the same manner and was turned out to be 22000 ppm.

INDUSTRIAL APPLICABILITY

The present invention makes it possible to effectively decrease carbon monoxide in a hydrogen gas generated by fuel reforming and to provide a hydrogen producing apparatus capable of supplying the hydrogen gas in a stable manner with a simple constitution. Further, it realizes a hydrogen producing apparatus which can operate in a stable manner over a long term even if start and stop operations are repeated and which needs less time for starting up the apparatus.

What is claimed is:

1. A hydrogen producing apparatus comprising: a reforming section having a reforming catalyst which causes a reaction between a carbon-containing organic compound as a feedstock and water; a feedstock supply section for supplying the feedstock to said reforming section; a water supply section for supplying water to said reforming section; a heating section for heating said reforming catalyst; and a shifting section having a shift catalyst which causes a shift reaction between carbon monoxide and water contained in a reformed gas supplied from said reforming section; wherein said shift catalyst comprises a platinum group metal; said shifting section is divided into plural catalytic reaction chambers each having the shift catalyst; of said plural catalytic reaction chambers, the catalyst temperature is lower in a downstream chamber than in an upstream chamber in the flowing direction of the reformed gas; and of said plural catalytic reaction chambers, the amount of the platinum group metal of the shift catalyst is greater in a downstream chamber than in an upstream chamber in the flowing direction of the reformed gas; and wherein in a first catalytic reaction chamber in the flowing direction of the reformed gas, the catalyst temperature is retained at not lower than 300° C. and not higher than 450° C.

2. The hydrogen producing apparatus in accordance with claim 1, wherein at least one of a heat radiating part and a cooling part is provided between the catalytic reaction chambers.

3. The hydrogen producing apparatus in accordance with claim 1, further comprising a diffusing part or a mixing part of the reformed gas between the catalytic reaction chambers.

4. The hydrogen producing apparatus in accordance with claim 1, wherein said shift catalyst further comprises cerium oxide.

* * * * *